May 14, 1940.    B. F. ANDERSON    2,200,975
GLASS CUTTING APPARATUS
Filed July 1, 1938    2 Sheets-Sheet 1

Inventor
BEN F. ANDERSON.
By
Frank Fraser,
Attorney

May 14, 1940.　　　B. F. ANDERSON　　　2,200,975
GLASS CUTTING APPARATUS
Filed July 1, 1938　　　2 Sheets-Sheet 2

Inventor
BEN F. ANDERSON.
By Frank Graser
Attorney

Patented May 14, 1940

2,200,975

UNITED STATES PATENT OFFICE 2,200,975

GLASS CUTTING APPARATUS

Ben F. Anderson, Shreveport, La., assignor to Libbey-Owens-Ford Glass Company, Toledo, Ohio, a corporation of Ohio Application July 1, 1938, Serial No. 217,008

2 Claims. (Cl. 33—32)

The present invention relates to cutting apparatus in general and more particularly to improved apparatus for use in the cutting of sheets or plates of glass or other sheet material.

It will be readily appreciated that the manual cutting of relatively large sheets or plates of glass, especially those of greater width than the reach of the operator, is attendant with certain obvious difficulties, among which may be mentioned the inconvenience of cutting such a large sheet as well as the liability of obtaining an inaccurate cut.

It is an aim of this invention to provide a novel form of cutting apparatus which is designed primarily for the splitting of relatively large sheets or plates of glass preparatory to cutting them into individual panes of various sizes, although it may be also used with equal facility and effectiveness in the cutting of smaller sheets or plates of glass or other sheet material.

An important object of the invention is the provision of an improved form of cutting apparatus together with novel means for supporting and guiding the same during the cutting operation in a manner that the glass sheets or plates can be rapidly and accurately cut.

Another important object of the invention is the provision of cutting apparatus employing a cutting diamond to score the glass, and means for effecting the desired adjustments of the cutting diamond and for securing it rigidly in properly adjusted position.

Other objects and advantages of the invention will become more apparent during the course of the following description, when taken in connection with the accompanying drawings.

In the drawings, wherein like numerals are employed to designate like parts throughout the same:

Figure 1:
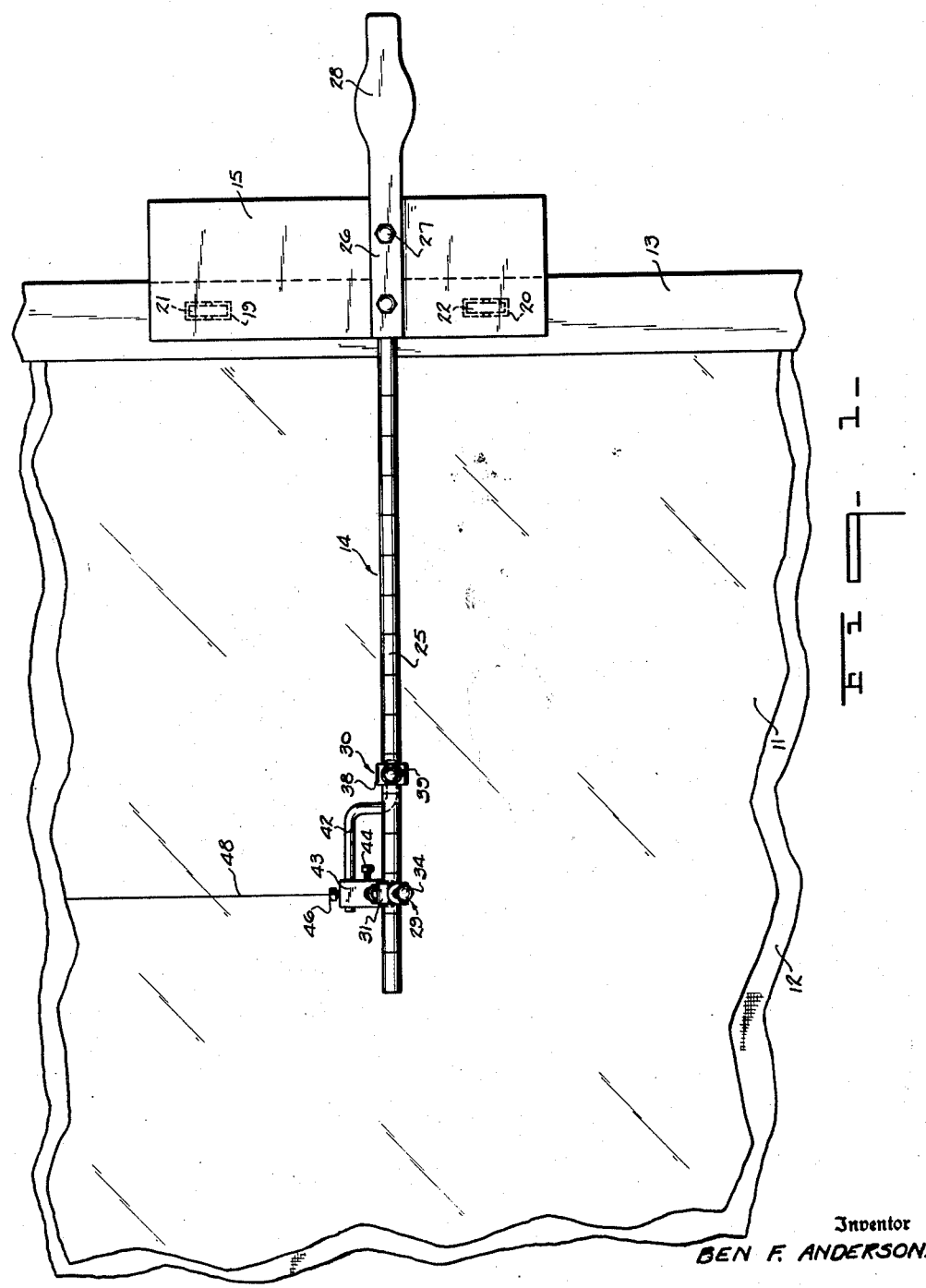
Fig. 1 is a plan view of cutting apparatus constructed in accordance with the present invention.

With reference to the drawings, the numeral 10 designates the flat horizontal top of a cutting table upon which the glass sheet or plate 11 to be cut is adapted to be laid; a pad 12 of felt or other suitable material preferably covering the top of said table to protect the glass against marring or scratching. Secured to the top of the cutting table along one side edge thereof is a straight edge 13 against which the adjacent side edge of the glass sheet 11 is adapted to abut.

Figure 2:
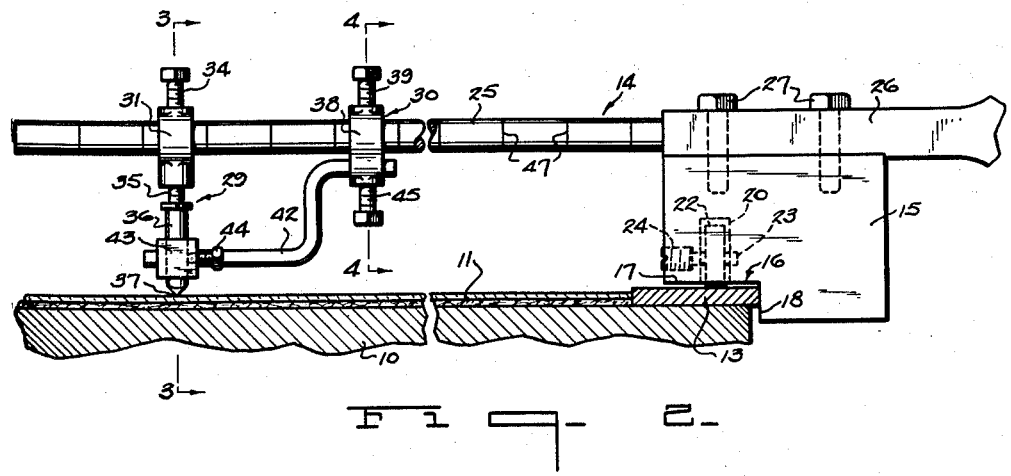
Fig. 2 is a front elevation thereof.
Figures 3, 4:
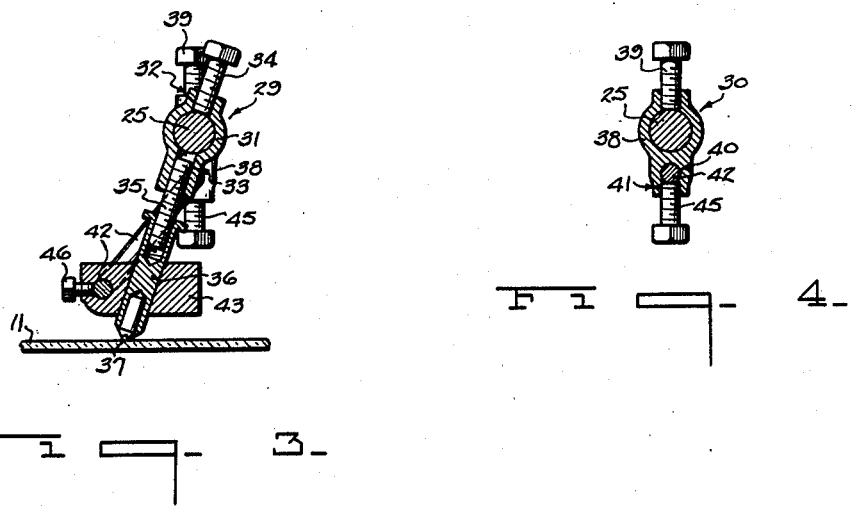
Fig. 3 is a vertical section through the cutting unit taken substantially on line 3—3 of Fig. 2.
Fig. 4 is a vertical section through the cutter stabilizing unit taken substantially on line 4—4 of Fig. 2.

The cutting apparatus provided by the invention is designated in its entirety by the numeral 14 and comprises a carrier 15 preferably in the form of a substantially rectangular block, which is notched at its lower inner corner as indicated at 16 in Fig. 2 to provide a horizontal surface 17 disposed above the straight edge 13 and a vertical surface 18 adapted to engage the outer edge of said straight edge. As shown, the straight edge 13 projects slightly beyond the adjacent side edge of the table top 10. The horizontal surface 17 of the carrier 15 is formed adjacent its opposite ends with recesses 19 and 20 and mounted in said recesses are the supporting rollers 21 and 22 respectively. Each roller is freely rotatable upon a horizontal pin 23 formed at the inner end of a screw 24 which is threaded horizontally within an opening in the corner 15. The lower portions of the rollers 21 and 22 project beneath the horizontal surface 17 of the carrier and are adapted to roll along upon the upper surface of the straight edge 13.

Carried by the carrier 15 and extending inwardly at substantially right angles with respect thereto is a horizontal supporting member or rod 25 overhanging said cutting table and disposed substantially parallel with the top 10 thereof, said supporting rod being mounted at its inner end in an arm 26 secured to the top of the carrier 15 by screws or the like 27. The arm 26 is formed outwardly of said carrier with a handle portion 28 which is adapted to be grasped by the operator during the cutting operation. Slidably carried by the rod 25 is the cutting unit designated in its entirety by the numeral 29 and also slidably carried by said rod is the cutter stabilizing unit 30 which serves to firmly hold the said cutting unit in properly adjusted position.

The cutting unit 29 comprises a collar 31 slidably and rotatably mounted upon the rod 25 and provided with oppositely disposed threaded openings 32 and 33. Received within the opening 32 is a set screw 34 which is adapted to engage rod 25 to hold the collar 31 in properly adjusted position thereon. Threaded within the opening 33 is one end of a screw 35, upon the opposite end of which is threaded the cutting ferrule 36 provided at its lower end with a cutting diamond 37.

When using a diamond as the cutting tool, it is essential to the proper scoring of the glass sheet that the cutting edge of the diamond be accurately positioned with respect to the glass so that it will effect an even and uniform scoring thereof. With the construction above described, it will be seen that by simply turning the cutting ferrule 36 upon screw 35, the cutting diamond 37 can not only be raised and lowered with respect to the glass sheet but it is also possible to attain a very fine adjustment of the cutting edge of the diamond with respect to the glass. When the diamond or the cutting edge thereon is new it is possible to bring a relatively long portion of the cutting edge into engagement with the glass sheet; however, after the cutting edge becomes worn or dulled, the diamond must be raised to move the point of the cutting edge into engagement with the glass and this adjustment can be effected by loosening the set screw 34 and turning the collar 31 upon supporting rod 25.

The cutter stabilizing unit 30 is provided to securely maintain the cutting diamond in the desired adjusted position and to also steady the same and prevent lateral movement thereof. The stabilizing unit 30 comprises a collar 38 also rotatably and slidably mounted upon the rod 25 and secured thereto by a set screw or the like 39. The collar 38 is provided beneath the rod 25 with a transverse opening 40 and intersecting said opening is a lateral opening 41. Loosely inserted through the transverse opening 40 is one end of a substantially S-shaped bracing arm 42 while the opposite end thereof passes loosely through an opening in a block 43 which is carried by the cutting ferrule 36, and secured thereto by a set screw 44. The set screw 44 serves to prevent accidental rotation of the cutting ferrule 36.

The bracing arm 42 is fixed to the collar 38 by a set screw 45 threaded through the opening 41 while the opposite end of said arm is secured to the block 43 by a set screw 46. When it is desired to adjust the angle of the cutting diamond 37, relative to the glass sheet, the set screws 34, 45 and 46 are first loosened to permit the ferrule 36 to be swung to the desired position and while held in such position the screws 34, 45 and 46 are tightened. The cutting ferrule 36 can be rotated within block 43 upon loosening of the set screw 44. The provision of the stabilizing unit 30 will assure the cutting diamond being held in properly adjusted position and against lateral movement. The cutting unit 29 and stabilizing unit 30 are slidable along the rod 25 upon loosening of the set screws 34 and 39 respectively and the said rod is preferably graduated by suitable markings 47 to facilitate the desired positioning of the cutting unit.

In operation, the sheet or plate of glass 11 to be cut is first laid upon the cutting table 10, with one side edge thereof abutting the inner edge of the straight edge 13. The cutting apparatus 14 is then positioned upon the cutting table as shown in Fig. 1, adjacent the rear end thereof, and is then moved forwardly over said table, with the cutting diamond being drawn over and in engagement with the glass sheet to effect the scoring thereof along the line 48. This movement of the cutting apparatus is greatly facilitated by the rollers 21 and 22 which roll along the top of the straight edge 13. During forward movement of the cutting apparatus over the table, it is important that the operator maintain the vertical surface 18 of the carrier 15 in contact with the outer edge of straight edge 13 to insure a perfectly straight, accurate cut. The cutting apparatus herein provided is of relatively simple, inexpensive construction and may be readily and conveniently associated with and removed from the cutting table. As stated above, the cutting apparatus herein provided is of particular utility in the splitting of relatively large sheets or plates of glass preparatory to cutting them into individual panes of glass and by the use of this apparatus the said sheets or plates can be rapidly and accurately cut.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus for cutting sheet glass as it is supported in a horizontal position upon the top of a table, a carrier supported upon and movable along said table and having a portion thereof engaging the outer edge of the said table to guide the same, a substantially horizontal supporting rod carried by said carrier and overhanging said table, a cutting unit including a collar slidably and rotatably mounted upon said supporting rod, means for securing said collar to said rod, a cutting ferrule rotatably carried by said collar and a cutting diamond carried by said ferrule; and a cutter stabilizing unit comprising a collar slidably and rotatably mounted upon said supporting rod, means for securing said collar to said rod and a bracing arm extending between and connected to said last mentioned collar and said cutting unit.

2. In apparatus for cutting sheet glass as it is supported in a horizontal position upon the top of a table, a carrier supported upon and movable along said table and having a portion thereof engaging the outer edge of the said table to guide the same, a substantially horizontal supporting rod carried by said carrier and overhanging said table, a cutting unit including a collar slidably and rotatably mounted upon said supporting rod, means for securing said collar to said rod, a cutting ferrule rotatably carried by said collar and a cutting diamond carried by said ferrule; and a cutter stabilizing unit comprising a collar slidably and rotatably mounted upon said supporting rod, means for securing said collar to said rod, a block for loosely receiving said cutting ferrule therethrough, means for securing said ferrule to said block to prevent rotation of the former relative to the latter and a bracing arm extending between and secured to said last mentioned collar and said block.

BEN F. ANDERSON.